United States Patent [19]

Sitges Menendez et al.

[11] Patent Number: 5,744,109
[45] Date of Patent: Apr. 28, 1998

[54] CONTINUOUS PROCEDURE FOR THE SIMULTANEOUS COLLECTION AND PRECIPITATION OF MERCURY IN GASES CONTAINING IT

[75] Inventors: Fernando Sitges Menendez, Salinas-Castrillon; Francisco Alvarez Tamargo, Luanco; Francisco Tamargo Garcia, Salinas-Castrillon; Matias Rodriguez Valcarcel, Piedras Blancas-Castrillon; Cavodonga Muruzabal Sitges, Salinas-Castrillon, all of Spain

[73] Assignee: Asturiana de Zinc, S.A., Asturias, Spain

[21] Appl. No.: 614,540

[22] Filed: Mar. 13, 1996

Related U.S. Application Data

[63] Continuation of Ser. No. 548,140, Oct. 25, 1995, abandoned.

[30] Foreign Application Priority Data

Oct. 26, 1994 [ES] Spain ................... 9402221

[51] Int. Cl.⁶ ................... B01D 53/64
[52] U.S. Cl. ................... 423/210; 423/101
[58] Field of Search ................... 423/210, 107, 423/108, 531, 101

[56] References Cited

U.S. PATENT DOCUMENTS

| | | | |
|---|---|---|---|
| 3,039,865 | 6/1962 | Gilbert et al. | 75/81 |
| 3,849,537 | 11/1974 | Allgulin | 423/210 |
| 3,855,387 | 12/1974 | Brockmiller et al. | 423/210 |
| 3,954,451 | 5/1976 | Kinoshita | 75/108 |
| 3,974,254 | 8/1976 | Herrera | 423/210 |
| 4,057,423 | 11/1977 | Kinoshita | 75/109 |
| 4,233,274 | 11/1980 | Allgulin | 423/210 |
| 4,336,237 | 6/1982 | Kudryk et al. | 423/531 |
| 4,443,417 | 4/1984 | Wiklund | 423/210 |
| 4,640,751 | 2/1987 | Dyvik et al. | 204/105 R |
| 4,764,219 | 8/1988 | Yan | 134/2 |
| 5,232,488 | 8/1993 | Gonzalez-Posada Sanchez et al. | 75/431 |

FOREIGN PATENT DOCUMENTS

| | | | |
|---|---|---|---|
| 624090 | 7/1961 | Canada . | |
| 064962 | 11/1982 | European Pat. Off. . | |
| 476079 | 3/1992 | European Pat. Off. . | |
| 2216357 | 8/1974 | France . | |
| 452178 | 10/1991 | France . | |
| 319476 | 3/1920 | Germany . | |
| 1075953 | 1/1958 | Germany . | |
| 4964557 | 6/1974 | Japan | 423/210 |
| 50-20997 | 3/1975 | Japan | 423/531 |
| 411067 | 1/1973 | Spain . | |
| 451533 | 9/1976 | Spain . | |
| 556731 | 6/1986 | Spain . | |
| 1431651 | 8/1974 | United Kingdom . | |
| 9114010 | 12/1991 | WIPO | 423/210 |

OTHER PUBLICATIONS

Database WPI, Section Ch, Week 7552, Derwent Publications Ltd., London GB; Class E37, AN 75-85573W for JP-A-50 117 604 (Agency of Ind Sci Tech), 13 Sep. 1975.

*Primary Examiner*—Gary P. Straub
*Assistant Examiner*—Timothy C. Vanoy
*Attorney, Agent, or Firm*—Ostrolenk, Faber, Gerb & Soffen, LLP

[57] ABSTRACT

Procedure for the simultaneous collection and precipitation of mercury in gases containing it. It consists on passing the mercury gas through a washing tower where hydrogen sulfide (gas) is continuously and intermittently injected at the same time that it is watered with a solution containing a mercury complex (II) stable in semi acid, such as $[I_2Hg]^{2-}$ or $[(SCN)_4Hg]^{2-}$, without requiring the use of an additional oxidant. Both the collection and precipitation of the mercury and the regeneration of the solution containing the mercury complex (II) take place simultaneously in just one stage.

6 Claims, 1 Drawing Sheet

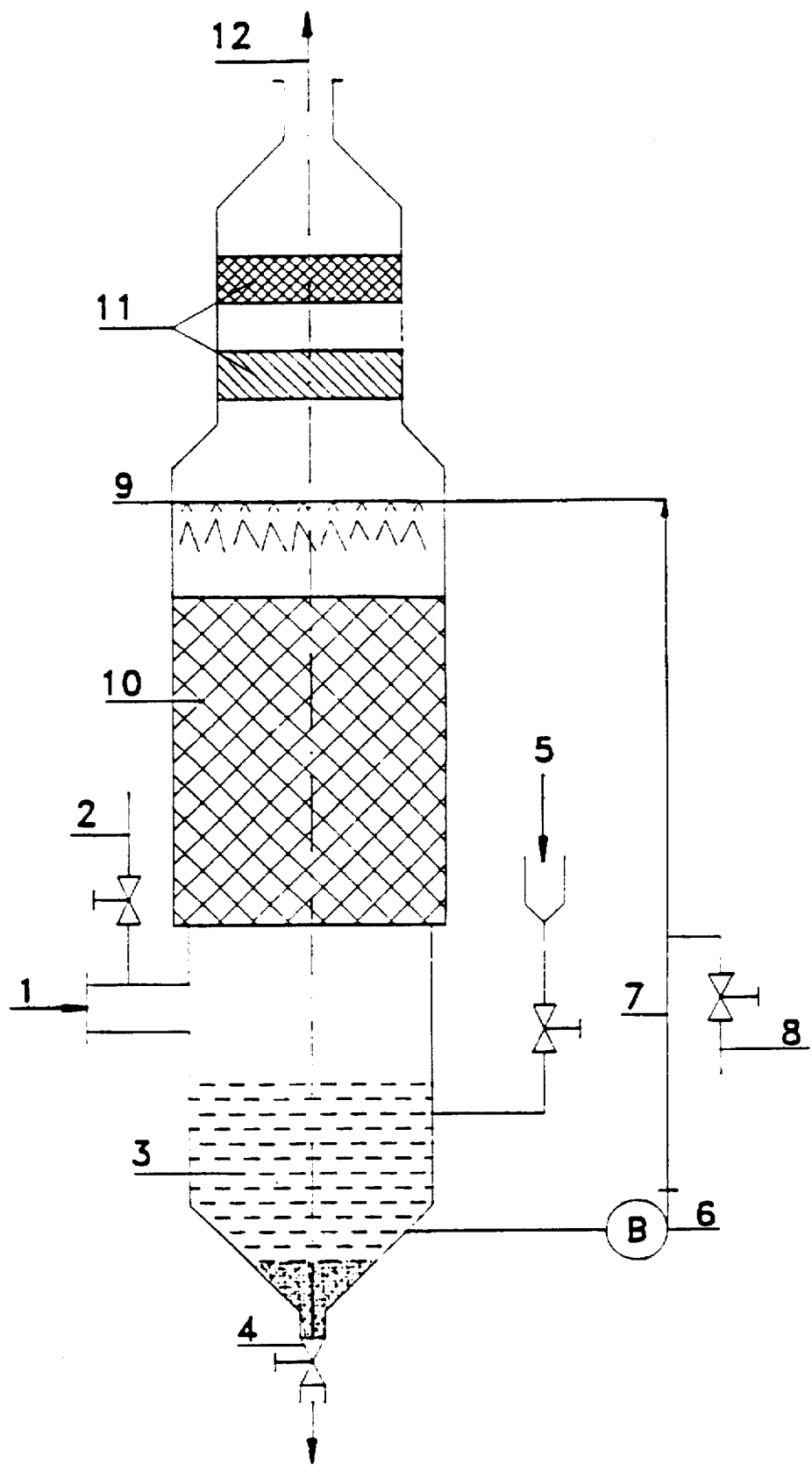

CONTINUOUS PROCEDURE FOR THE SIMULTANEOUS COLLECTION AND PRECIPITATION OF MERCURY IN GASES CONTAINING IT

This is a continuing application based on Ser. No. 08/548,140 of Oct. 25, 1995, now abandoned.

BACKGROUND OF THE INVENTION

This invention generally relates to a procedure to separate mercury from gases containing it and, more specifically, using a continuous procedure for the simultaneous collection and precipitation in one stage only of the mercury contained within those gases.

The are many processes in which gases containing mercury are given off, not only in mercury production factories, but also in other processes such as the obtention of chlorine by the alkaline process, and in calcination, sintering, scrap metal recuperation processes and at plants where sulphured minerals are roasted to fabricate $SO_2$ and $H_2SO_4$, or for the recovery of metals such as lead, copper, zinc, etc.

The gases with high mercury content are treated for their purification either dry: decanters, electrostatic precipitators, etc., or wet: washing and cooling, wet electrofilters, etc., but despite these measures the gas, due to the high mercury vapor pressure, may contain significant mercury quantities. For example, a gas cooled down to 30° C. may contain up to 30 mg/m$^3$N.

Both for environmental reasons, if the gases are sent off to the atmosphere, as to prevent contamination of the products manufactured using these gases, it is necessary to effect a thorough purification in order to bring down the mercury content below 0.05 mg/m$_3$N.

The state of the art includes the knowledge of a number of methods used to depurate said gases.

Thus, German patent 1.075.953 describes the use, to that end, of filters with solid materials, such as coal.

The Spanish patent 451.533 uses the wet method for washing using certain solutions, to which end a two stage process is used, one to collect the mercury through washing in a tower with an aqueous solution of a mercury complex and another state in which the part of the tower liquid is extracted so as to regenerate oxidizing and precipitating part of the mercury.

Spanish patents 411.067, 556.731 and 9000643 claim a roasting gases purification process in which mercury is oxidized with the $SO_2$ itself, contained within the gas.

Furthermore, patent 9000643 claims that said process is effected in two stages using two irrigation towers with an aqueous solution containing thiocyanates and active coal, with a wet electrofilter between them.

The processes of the prior technique described with reference to the Spanish patents number 411.067, 556.731 and 9000643 are applicable only to gases containing $SO_2$.

SUMMARY OF THE INVENTION

This invention provides now a procedure for the collection and recovery of the mercury contained in combustion gases, roasting gases and other gases containing mercury in gaseous state, through direct precipitation of the mercury in the form of mercuric sulphur.

The procedure of the invention has only one stage and takes place in just one tower, consisting of passing the mercury gas through a washing tower where hydrogen sulphur (gas) is injected continuously or intermittently at the same time that it is watered with a solution containing a mercury complex (II) stable in semi acid, such as $[I_4Hg]^{2-}$ or $[(SCN)_4Hg]^{2-}$, without requiring the use of an additional oxidant.

DESCRIPTION OF THE INVENTION

Therefore, and in accordance with the above statements, the invention provides a procedure to separate Hg from gases containing it, through contact with said gases, in a washing tower, with a solution containing a Hg complex (II) stable in semi acid, that may contain active carbon in suspension, characterized because the collection and precipitation of Hg as mercuric sulphur and the regeneration of the Hg (II) complex takes place simultaneously and in only one stage through injection of gaseous $H_2S$ in said washing tower.

Conveniently the gas temperature at the tower entrance must not be greater than 50° C.

Pursuant to the invention, the collection and precipitation of the mercury takes place as per a number of reactions in which mercuric compounds are formed which are immediately oxidized and precipitated as mercuric sulphur (II). These reactions may be summarized as follows.

  [1]

  [2]

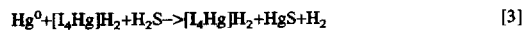  [3]

In case of using thiocyanate as chelating anion, the reactions would be the same substituting the SCN for I.

As may be observed in the reaction above, the concentration of the mercuric complex remains unaltered if the hydrogen sulphur injection is effected in a controlled way, due to which is not necessary to extract the liquid from the tower to regenerate it as the state of the art required up to now.

The addition of hydrogen sulfide is easy to control, given that it is sufficient to analyze the solute Hg (II) and maintain it at a previously fixed solution.

If iodine anion is used as a chelating agent, the Hg (II) concentration must then be kept between 0.3 and 1.0 g/l, whereas it must be kept between 3 and 10 g/l if thiocyanate anion is used as a chelating agent. It is possible to work with larger Hg (II) concentrations but it is not advisable, both from the financial point of view, given that a greater chelating anion concentration would then be required, and from the practical point of view, given that the purified gas may be contaminated if the washing solution with high mercury content is drawn off.

The chelating anion concentration must be greater than the stoichiometric quantity to form the mercury complex (II) so as to prevent the intermediate mercuric compounds from becoming stable.

The washing solution must be slightly acid and as the acidity is not modified during the process, it is sufficient to add 2 g/l of $H_2SO_4$ when initially preparing the washing solution.

Notwithstanding this, the use of greater acid concentration does not decrease the efficiency of the system.

In some cases, whenever the gas mercury content is high, the reaction of the dismutation:

  [4]

may be faster than the oxidation and precipitation reaction [2]. Active carbon that absorbs the Hg° and facilitates its oxidation and precipitation may be used to prevent the Hg° coming off.

The procedure of the invention is characterized by its simplicity, given that the whole process takes place in just one stage, using a sole washing tower.

BRIEF DESCRIPTION OF THE DRAWING

FIG. 1 shows a scheme of execution of the procedure of the invention.

DESCRIPTION OF THE DRAWING

As shown in FIG. 1, the tower has an inlet for gases containing mercury (1), a $H_2S$ (gas) injector (2), a tank containing the washing solution (3), fitted with a purging outlet (4) to extract solids containing mercury and an inlet (5) through which reactives are introduced. The liquid is impelled using the pump (6) through the pipe (7), fitted with a sampling valve (8), and to the device (9) watering the interior (10) of the tank (3). The gas crossing the tower passes through a drop separator (11) and comes out, already purified of mercury, through the conduit (12).

The procedure of the invention presents clear advantages over current state of the art processes, among which advantages the following may be emphasized:

The process takes place in just one stage and only requires a washing tower. Spanish patent 9000643 claims the use of two watering towers and a wet electrofilter placed between the two towers.

It is not necessary for the gases to be purified to contain $SO_2$ to oxidize elemental mercury, as stated in Spanish patents 411.067, 556.731 and 9000643. Because of this, the invention hereby presented is applicable not only to gases resulting from roasting sulphurated minerals, but also to other type of gases containing mercury.

Neither a second stage to regenerate the solution nor the use of an additional oxidizing agent are required, as claimed in Spanish patent 451.533.

The injection of $H_2S$ (gas) in the washing tower itself is the key of the process according to the invention, given that its addition Does not modify the watering liquid volume, given that it is injected in a gaseous state.

Does not modify the concentration of ions in solution, given that the sulphur precipitates forming mercury sulphur (II) and the hydrogen supplied is compensated by that given off by the oxidation of elemental mercury and acidity does therefore remain constant.

Does not modify the concentration of the mercury complex (II) as may be observed in the reaction [3].

As a consequence of this, it is not necessary to extract liquid from the tower to regenerate it, as claimed in Spanish patent 451.533. It is only necessary to purge the solids that contain the precipitated mercury and to compensate the mechanical losses of reactives. The $H_2s$ (gas) is the only product consumed in the reaction and in very small quantities, 0.17 kg of $H_2S$ per kg of purified Hg.

Next, the procedure of the invention shall be described with reference to the following examples, which must be considered as merely illustrative in respect of the scope of the invention and under no circumstances must they be interpreted as limiting the invention in any way.

EXAMPLE 1

A current of $Hg^o$ saturated $N_2$ at 20° C. (15 mg $Hg^o/m^3N$) maintaining a 30 l/h flow rate, together with 7 l/h of another $N_2$ current containing 9 ppm of $H_2S$ was made to flow through a washing vessel containing a solution with 0.5 g/l of Hg (II), 3 g/l of $I^-$ and 5 g/l of $H_2SO_4$. These conditions were maintained over 120 hours, the outlet gas was analyzed and the concentration at all times was lower than 0.05 $mg/m^3N$.

EXAMPLE 2

In a tower as that shown in FIG. 1 were treated 50.000 $m^3N/h$ of gas coming from a blende roasting oven containing 7% of $SO_2$ and a 25 $Mg/m^3$ $Hg^o$ content. The gas entered the tower at a temperature of 30° C. The $H_2S$ injection was 140 l N/h. The washing solution contained 8 g/l of Hg(II), 13 g/l of $SCN^-$ 10 g/l of $H_2SO_4$ and 2 g/l of active coal. The purified gas at the tower outlet contained 0.03 mg of $Hg^o/m^3N$. This gas was used to manufacture sulfuric acid and the mercury content in the acid was lower than 0.5 ppm.

We claim:

1. Continuous procedure for the simultaneous collection and precipitation of mercury from gasses containing it and regenerating precipitation reagent, in a single stage, comprising contacting said gases, in a single stage washing tower, with a solution containing a thiocyonate complex of Hg (II) in acid medium, and simultaneously injecting gaseous hydrogen sulfide in said washing tower to precipitate mercuric sulfide and regenerate the Hg (II) complex in condition for immediate use in said single stage.

2. Procedure of claim 1, wherein the amount of hydrogen sulphide injected in the tower is stoichiometric to the amount of mercury in the gas.

3. Procedure of claim 1, wherein the amount of hydrogen sulfide injected is regulated based on analysis of the Hg (II) contained in the watering solution.

4. Procedure of claim 1, wherein the quantity of mercury (II) in solution is at least of 3.0 g/l.

5. Procedure of claim 1, wherein the concentration of the thiocyanate anion forming the complex with the mercury (II) is greater than the stoichiometric amount required to form the complex.

6. Procedure of claim 1, wherein said solution also contains active charcoal in suspension therein.

* * * * *